United States Patent
Almotlaq et al.

(10) Patent No.: US 10,151,512 B1
(45) Date of Patent: Dec. 11, 2018

(54) SOLAR HEATING APPARATUS

(71) Applicants: KING SAUD UNIVERSITY, Riyadh (SA); QUDRA ENERGY COMPANY, Riyadh (SA)

(72) Inventors: Yousef Abdullah Almotlaq, Riyadh (SA); Mazen Abdullah Baabbad, Riyadh (SA); Hany Abdulrahman Alansary, Riyadh (SA); Essam Abdulaziz Al Ammar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/786,458

(22) Filed: Oct. 17, 2017

(51) Int. Cl.
 *F24S 30/452* (2018.01)
 *F24S 23/70* (2018.01)
 *F24S 50/20* (2018.01)
 *F24S 30/00* (2018.01)

(52) U.S. Cl.
CPC ............ *F24S 30/452* (2018.05); *F24S 23/70* (2018.05); *F24S 50/20* (2018.05); *F24S 2030/133* (2018.05); *F24S 2030/134* (2018.05); *F24S 2030/135* (2018.05)

(58) Field of Classification Search
CPC .......... F24J 2/542; F24J 2/5417; F24J 2/5427; F24S 30/452; F24S 50/20; F24S 2030/134; F24S 2030/133; F24S 23/70; F24S 2030/135
USPC ....................................................... 126/607
See application file for complete search history.

(56) References Cited

U.S. PATENT DOCUMENTS

| | | |
|---|---|---|
| 4,102,326 A | 7/1978 | Sommer |
| 4,116,539 A | 9/1978 | Evans |
| 4,276,872 A | 7/1981 | Blake |
| 4,299,445 A | 11/1981 | Aucouturier |
| 4,317,031 A | 2/1982 | Findell |
| 7,647,924 B2* | 1/2010 | Hayden .................. F24J 2/4636 126/600 |
| 8,000,014 B2 | 8/2011 | Whitehead |
| 9,441,858 B2 | 9/2016 | Ba-abbad |
| 2005/0034751 A1 | 2/2005 | Gross |
| 2007/0034207 A1* | 2/2007 | Niedermeyer ........... F24J 2/055 126/600 |
| 2007/0070531 A1 | 3/2007 | Lu |
| 2010/0175741 A1* | 7/2010 | Thorne .................. F24J 2/5424 136/251 |

(Continued)

FOREIGN PATENT DOCUMENTS

WO 2013079824 A1 6/2013

*Primary Examiner* — Kenneth Rinehart
*Assistant Examiner* — Logan Jones
(74) *Attorney, Agent, or Firm* — Richard C. Litman

(57) ABSTRACT

The solar heating apparatus has a base box and a main axle mounted on the base box. At least one mirror support arm is mounted orthogonal to the main axle and supports a plurality of mirrors. In a first embodiment, a circular plate on the side of the base box rotates the main axle to bank the mirrors to track azimuth and a belt or chain drive rotates the mirror support arms to track elevation. In a second embodiment, the main axle is a beam mounted on a rotating circular plate on top of the base box to track azimuth and bevel gears drive a belt or chain drive that rotates the mirror support arms to track elevation. In a third embodiment, the mirror support arms are driven to rotate by bevel gears and the main axle through belt or chain drives.

6 Claims, 12 Drawing Sheets

(56) References Cited

U.S. PATENT DOCUMENTS

2012/0125404 A1 5/2012 Teixeira Ramos
2014/0166077 A1* 6/2014 Gupta .................. F24J 2/12
　　　　　　　　　　　　　　　　　　　　136/246

* cited by examiner

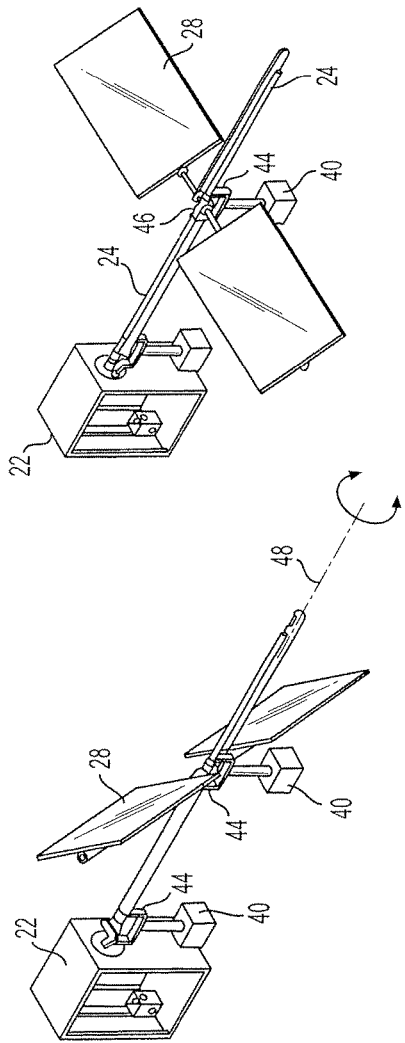
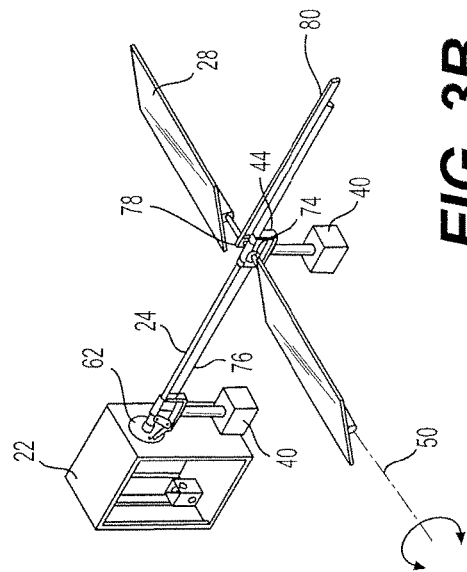
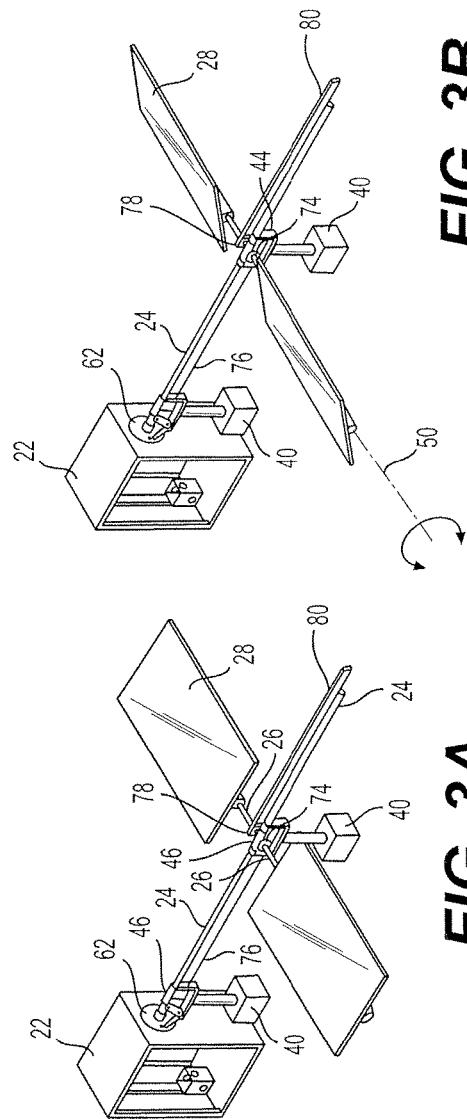

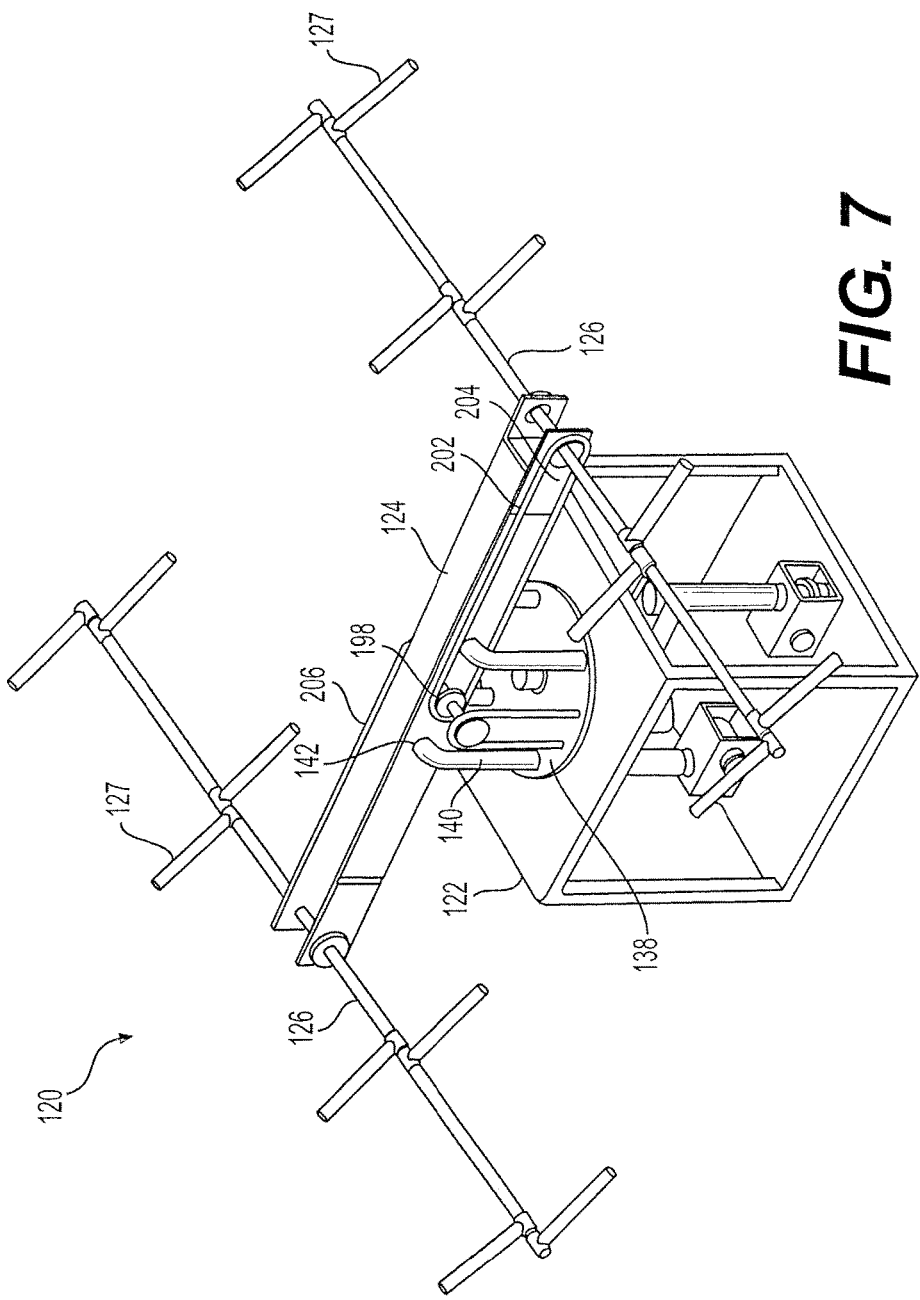

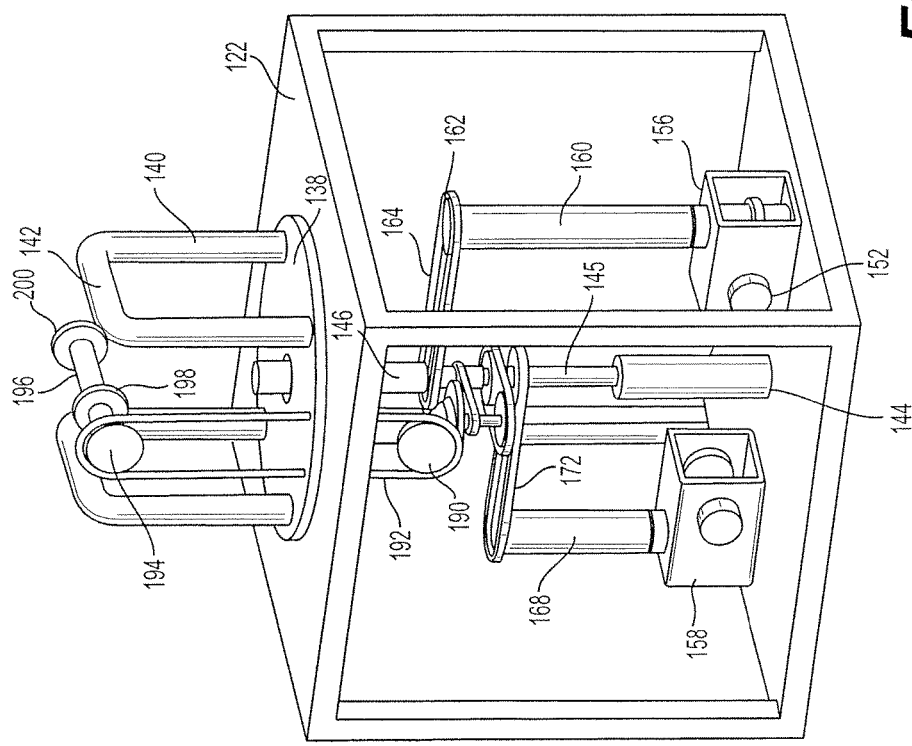

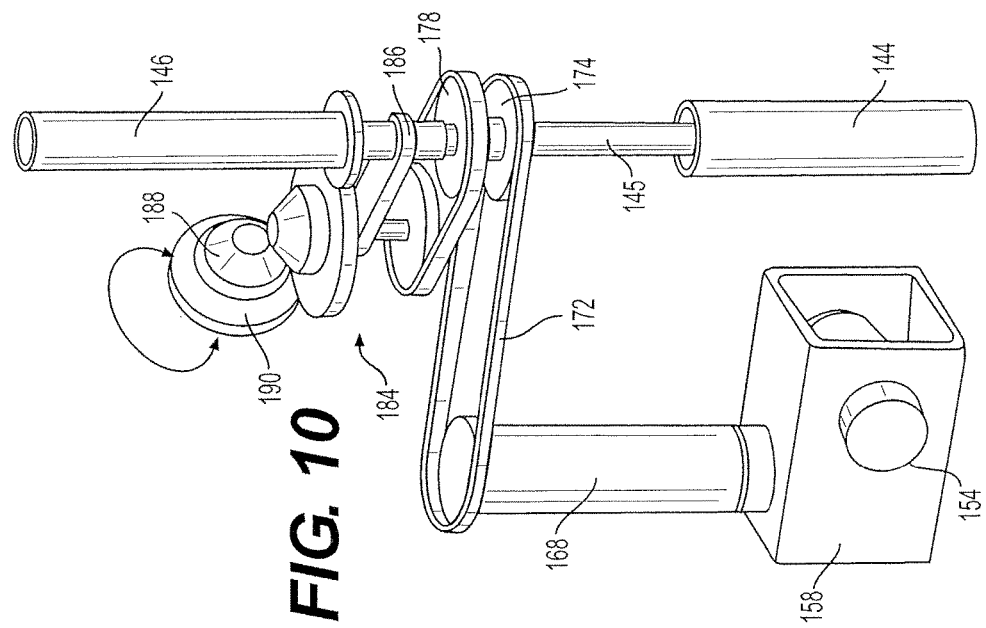
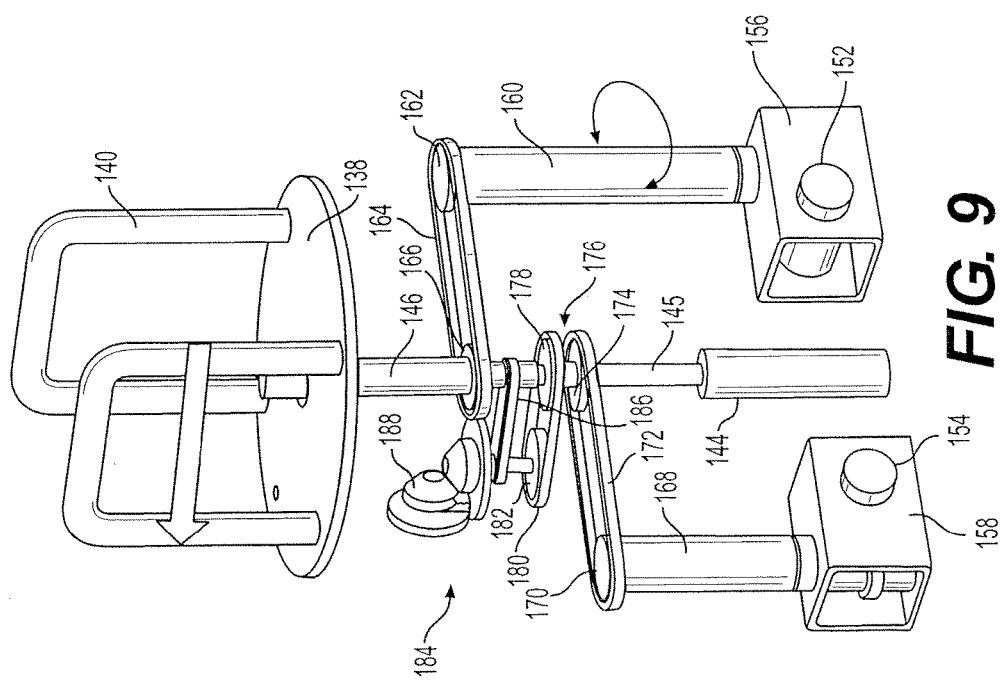

SOLAR HEATING APPARATUS

BACKGROUND

1. Field

The disclosure of the present patent application relates to solar tracking for solar collectors, and particularly to a solar heating apparatus that provides hardware for selectively and controllably manipulating rows and columns of reflectors along multiple axes of rotation to track the position of the sun.

2. Description of the Related Art

Concentrated solar power systems generate solar power by using mirrors or lenses to concentrate a large area of sunlight or solar thermal energy onto a small area. Electricity is generated when the concentrated light is converted to heat, which drives a heat engine (typically a steam turbine) connected to an electrical power generator, or which powers a thermochemical reaction. Heat storage in molten salts allows some solar thermal plants to continue to generate after sunset and adds value to such systems, when compared to photovoltaic panels.

Parabolic trough reflectors for solar concentrators are formed from a linear parabolic reflector that concentrates light onto a receiver positioned along the reflector's focal line. The receiver is a tube positioned directly above the middle of the parabolic mirror and filled with a working fluid. The reflector follows the sun during daylight hours by tracking along a single axis. A working fluid (e.g., molten salt) is heated to 150-350° C.) as it flows through the receiver and is then used as a heat source for a power generation system. Numerous control and tracking systems exist for driving parabolic trough reflectors to rotate according to the position of the sun, as well as solar radiation availability under changing weather conditions.

A solar power tower includes an array of dual-axis tracking reflectors (commonly referred to as heliostats) that concentrate sunlight on a central receiver atop a tower. The receiver contains a fluid deposit, such as seawater. Optically, a solar power tower is equivalent to a circular Fresnel reflector. The working fluid in the receiver is heated to 500-1000° C. and then used as a heat source for a power generation or energy storage system. An advantage of the solar tower is that the reflectors can be adjusted, rather than the whole tower being repositioned. Solar power towers are presently of great interest, as they offer higher efficiency and better energy storage capability than the older parabolic trough reflector technology. However, solar power tower development is presently far less advanced. It would obviously be desirable to be able to integrate tracking and control systems, such as those used with parabolic trough reflectors, into the arrays of reflectors used with solar power towers. Such systems would have to be modified for rotation about multiple axes, rather than the single axis rotation typically used with parabolic trough reflectors. Thus, a solar heating apparatus solving the aforementioned problems is desired.

SUMMARY

The solar heating apparatus has a base box and a main axle mounted on the base box. At least one mirror support arm is mounted orthogonal to the main axle and supports a plurality of mirrors. The main axle and the mirror support arm are adjustable to track the azimuth and elevation of the sun. In a first embodiment, a circular plate on the side of the base box rotates the main axle to bank the mirrors to track azimuth and a belt or chain drive rotates the mirror support arms to track elevation. In a second embodiment, the main axle is a beam mounted on a rotating circular plate on top of the base box to track azimuth and bevel gears drive a belt or chain drive that rotates the mirror support arms to track elevation. In a third embodiment, the mirror support arms are driven to rotate by bevel gears and the main axle through belt or chain drives. In each case, the amount, speed, and direction of rotation may be controlled by conventional solar tracking software.

The mirrors (or solar reflectors) reflect the sun's radiation onto a thermal solar collector, which includes a fluid medium that is heated by the sun's radiation. The accumulated thermal energy may be used directly for applications that are powered thermally, or used with heat exchangers or the like for conversion to electrical or mechanical energy.

These and other features of the present disclosure will become readily apparent upon further review of the following specification and drawing.

BRIEF DESCRIPTION OF THE DRAWINGS

FIG. 2A is a partial perspective view of the solar heating apparatus of FIG. 1, showing the mirrors banked around an axis defined by the main axle to track azimuth.

FIG. 2B is a partial perspective view of the solar heating apparatus of FIG. 1, showing the mirror support arms banked horizontal and parallel to the ground.

FIG. 3A is a partial perspective view of the solar heating apparatus of FIG. 1, showing the mirrors tilted horizontal and parallel to the ground.

FIG. 3B is a partial perspective view of the solar heating apparatus of FIG. 1, showing the mirror support arms rotated about an axis defined by the arms to tilt the mirrors at an oblique angle relative to the ground to track elevation.

FIG. 7 is a perspective view of the apparatus of FIG. 6 with the mirrors removed and with the front and side wall of the base box removed.

FIG. 8 is a perspective view of the base box of the apparatus of FIG. 6 with the beam removed and with the front and side wall of the base box removed.

FIG. 9 is a perspective view of the drive mechanisms of the apparatus of FIG. 6 with the base box omitted, showing the belt/chain drive for rotation of the beam and the belt/chain drive with bevel gear for rotation of mirror support arms.

FIG. 10 is a perspective view of the bevel gear drive mechanism of the apparatus of FIG. 6, the base box being omitted.

Similar reference characters denote corresponding features consistently throughout the attached drawings.

DETAILED DESCRIPTION OF THE PREFERRED EMBODIMENTS

The solar heating apparatus includes a plurality of mirrors or other solar reflectors that are arranged in rows and columns and focus reflected solar radiation on at least one solar collector including a fluid, such as water or molten salt (e.g., nitrites), that is heated by the reflected radiation. The heated fluid may be stored or used in a heat exchanger for power generation, desalination, or other purposes. The solar collector may be mounted on a tower, or may be a plurality of collectors spaced apart across a bridge or the like, with multiple rows and columns focused on each collector. The mirrors may be Fresnel mirrors, plane mirrors, or other reflector suitable for the application.

The solar heating apparatus has a base box and a main axle mounted on the base box. At least one mirror support arm is mounted orthogonal to the main axle and supports a plurality of mirrors. The main axle and the mirror support arm are adjustable to track the azimuth and elevation of the sun. In a first embodiment, a circular plate on the side of the base box rotates the main axle to bank the mirrors to track azimuth and a belt or chain drive rotates the mirror support arms to track elevation. In a second embodiment, the main axle is a beam mounted on a rotating circular plate on top of the base box to track azimuth and bevel gears drive a belt or chain drive that rotates the mirror support arms to track elevation. In a third embodiment, both the main axle and the mirror support arms are driven to rotate by bevel gears through belt or chain drives. In each case, the amount, speed, and direction of rotation may be controlled by conventional solar tracking software.

Figure 1:
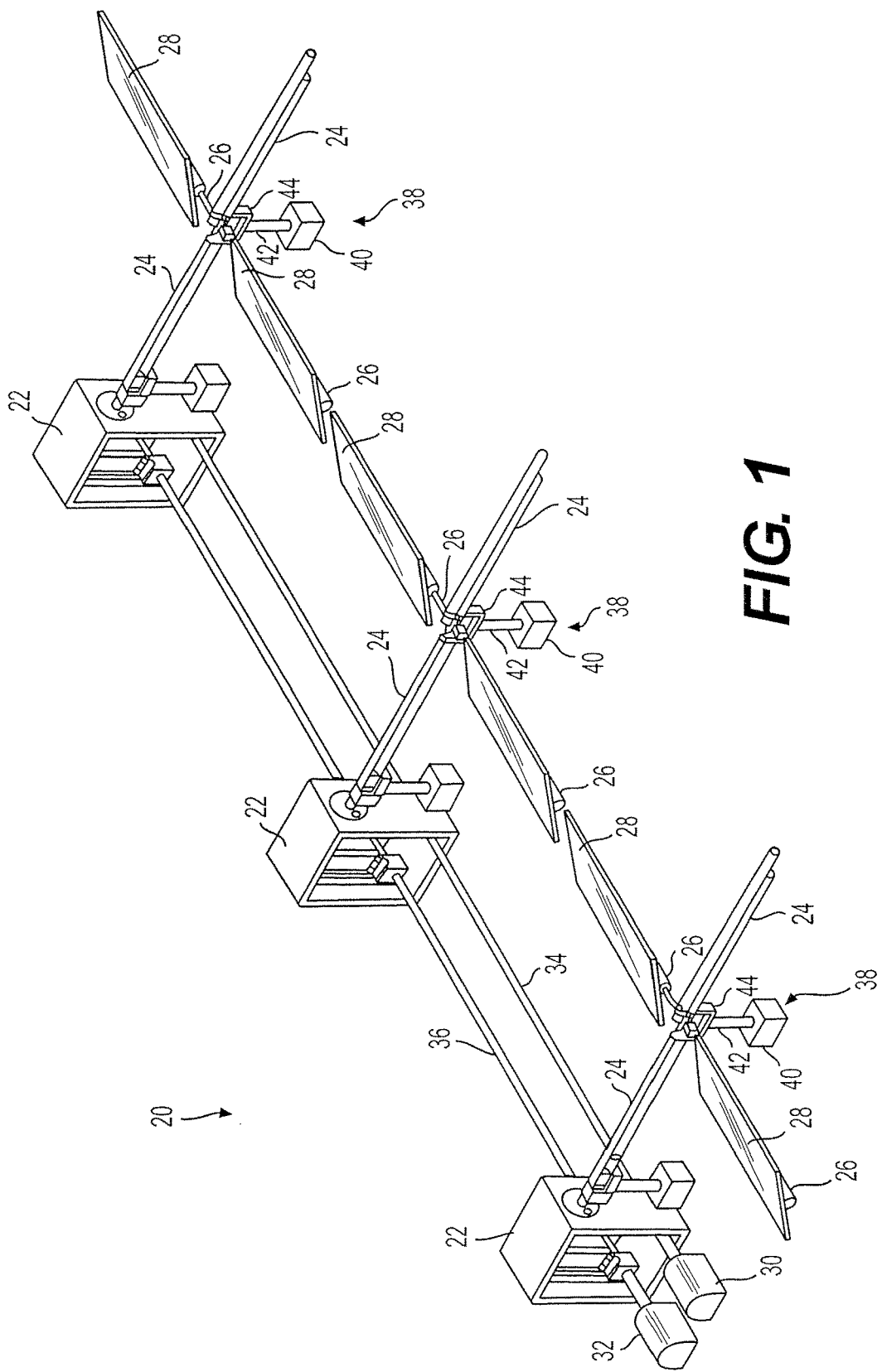
FIG. 1 is a partial perspective view of a first embodiment of a solar heating apparatus.

FIG. 1 illustrates a first embodiment of the solar heating apparatus, designated as 20 in the drawings. The drawing shows three exemplary base boxes 22, each base box 22 having a main axle 24 extending from an upper part thereof. A pair of mirror support arms 26 extend orthogonally from each main axle 24, each mirror support arm 26 having a pair of mirrors 28 mounted thereon. A pair of tracking servo or stepper motors, including an azimuth tracking motor 30 and an elevation tracking motor 32, have a corresponding power transmission shaft 34, 36 extending through the lower portion of each base box 22. Each main axle 24 is supported above the ground at opposite ends by a stanchion 38, which includes a footer 40, a post 42, and a bracket 44. It will be understood that only a single row of mirrors 28 is shown for simplicity of illustration. In practice, the apparatus 20 may have a plurality of successive rows of mirrors 28 extending away from the base boxes 22. Similarly, the apparatus may include more than three base boxes 22, each defining an additional column of mirrors 28, or may include additional three-base box sections of mirrors 28 powered by a pair of motors 30, 32 in a field or array of solar reflectors.

As shown in FIGS. 2A-3B, the stanchion brackets 44 are generally U-shaped, and have a linkage or coupler 46, referred to herein as a Two Axis Rotational Element (TARE), mounted across the yoke. The main axle 24 is segmented. Each segment extends axially into one end of the coupler 46, and the next segment extends axially from the opposite end of the coupler 46. Each segment is rotationally supported by bearings or the like, and all segments in a column are constrained to rotate as a unit, defining a first rotational axis 48, as shown in FIGS. 2A and 2B. The mirror support arms 26 extend laterally from opposite sides of the coupler, also rotationally supported by bearings or the like, and define a second rotational axis 50, as shown in FIGS. 3A and 3B. As shown in FIGS. 2A-2B, rotation of the main axle 24 banks or rolls the mirror support arms 26 and mirrors 28 mounted thereon around the first rotational axis 48 to track the changing azimuth of the sun. As shown in FIGS. 3A-3B, rotation of the mirror support arms 26 tilts the mirrors 28 to extend parallel to the ground or to extend at an oblique angle relative to the ground in order to track changes in the sun's elevation.

The main axle 24 and the mirror support arms 26 are preferably made from a tubular, corrosion resistant, lightweight metal, such as aluminum. As described above, the main axle 24 is made in tubular segments that only extend between adjacent couplers 46, but which are slaved to rotate together around the first axis 48 as though the segments formed a single tube. The spacing of the stanchions 38 distributes the load applied by the weight of the mirrors and by wind shear more evenly, requires less expensive structural elements than solar reflectors mounted on a single support, and provide easier access to the reflectors (mirrors 28) for cleaning.

Figure 5:
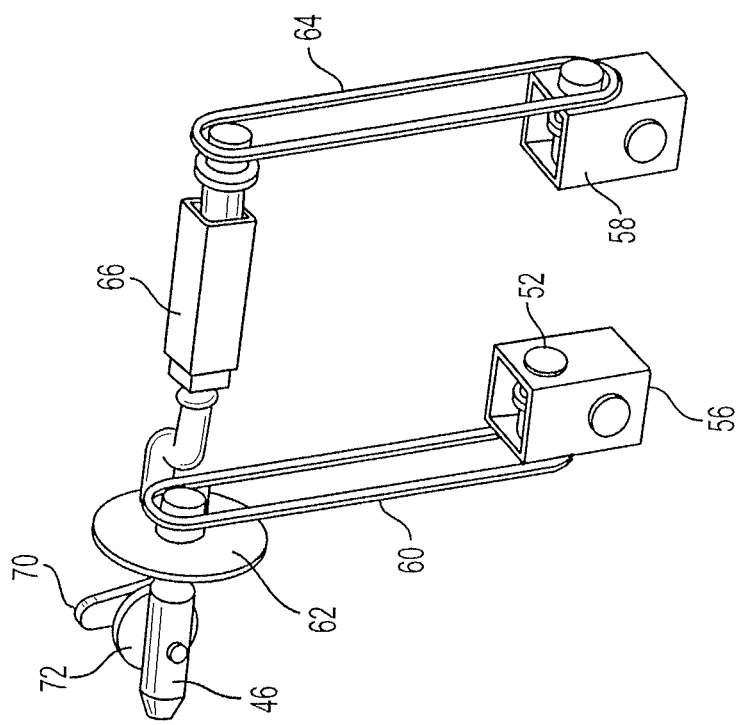
FIG. 5 is a perspective view of a drive mechanism of the solar heating apparatus of FIG. 1, shown from the rear and with the base box omitted to show details thereof.
Figure 4:
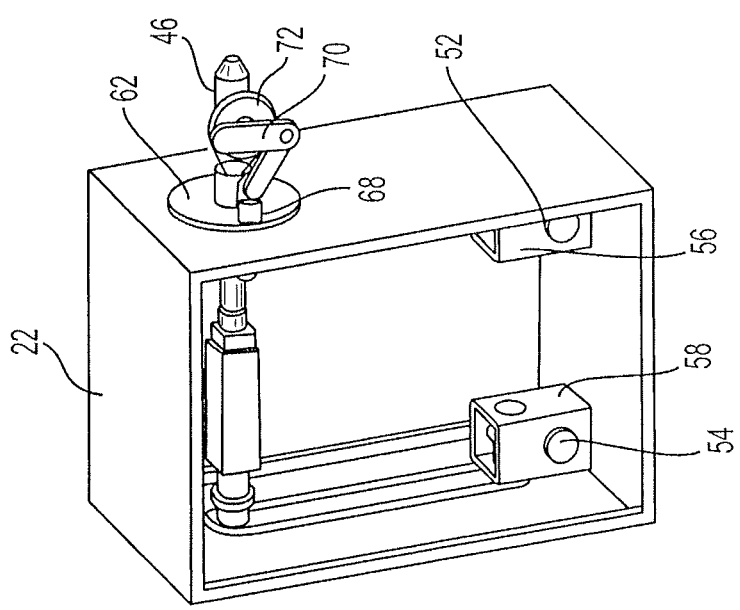
FIG. 4 is a partial perspective view of a base box of the solar heating apparatus of FIG. 1, shown with the front wall removed to show details of the drive mechanism.

Referring to FIGS. 4 and 5, the power transmission shafts 34, 36 extend through corresponding openings 52, 54 in the respective gear boxes 56, 58 where they drive a suitable gear train. The azimuth gear box 56 drives a chain drive 60 or belt drive that rotates a circular plate 62 on the upper portion of the base box 22. The circular plate 62 has one end of a coupler 46 affixed thereto, the main axle 24 extending from the coupler 46. Thus, rotation of the azimuth power transmission shaft 34 simultaneously banks all mirrors 28 controlled by the base box 22 through which the power transmission shaft 34 extends to track changes in the sun's azimuth.

On the other hand, the elevation gear box 58 drives a chain drive 64 or belt drive that rotates a jack screw 66 or screw drive that extends through a pass-through tube 68 in the circular plate 62 to extend or retract a crank arm 70 attached to the drive wheel 72 of another chain drive or belt drive, the drive wheel 72 being mounted on a side of the coupler 46 fixed to the circular plate 62. The wall of the base box 22 may have a circular arc defined therein to allow rotation of the jack screw shaft within prescribed limits as the circular plate 62 rotates. The drive wheel 72 is connected to the driven sprocket 74 on the shaft of the mirror support arm 26 on one side of the coupler 46 closest to the corresponding base box 22 by a chain 76 (shown in FIGS. 3A and 3B) to adjust the tilt of the mirror 28 for changes in the sun's elevation. A corresponding sprocket 78 on the opposite side of the coupler 46 is slaved to rotate by rotation of sprocket 74, thus rotating the mirror support arm 26 on the opposite side of the coupler 26, and also driving rotation of another chain 80 to adjust the tilt of any further mirrors if there is a second row of mirrors downstream from the base boxes. It will be understood that the stanchion and driven sprocket supporting the free end of chain 80 are omitted from FIGS.

3A and 3B, but are substantially a mirror image of the stanchion 38 and sprocket 74 supporting chain 76. The eccentric bends in the shaft of the jack screw 66 and the pass-through tube 68 in the circular plate 62 permit actuation of the drive wheel 72, even when the main axle 24 has been rotated to track changes in the sun's azimuth. Thus, the solar heating apparatus 20 of FIGS. 1-5 permits an array of mirrors or solar reflectors to be adjusted by an azimuth motor and an elevation motor to track changes in the sun's position.

Figure 6:
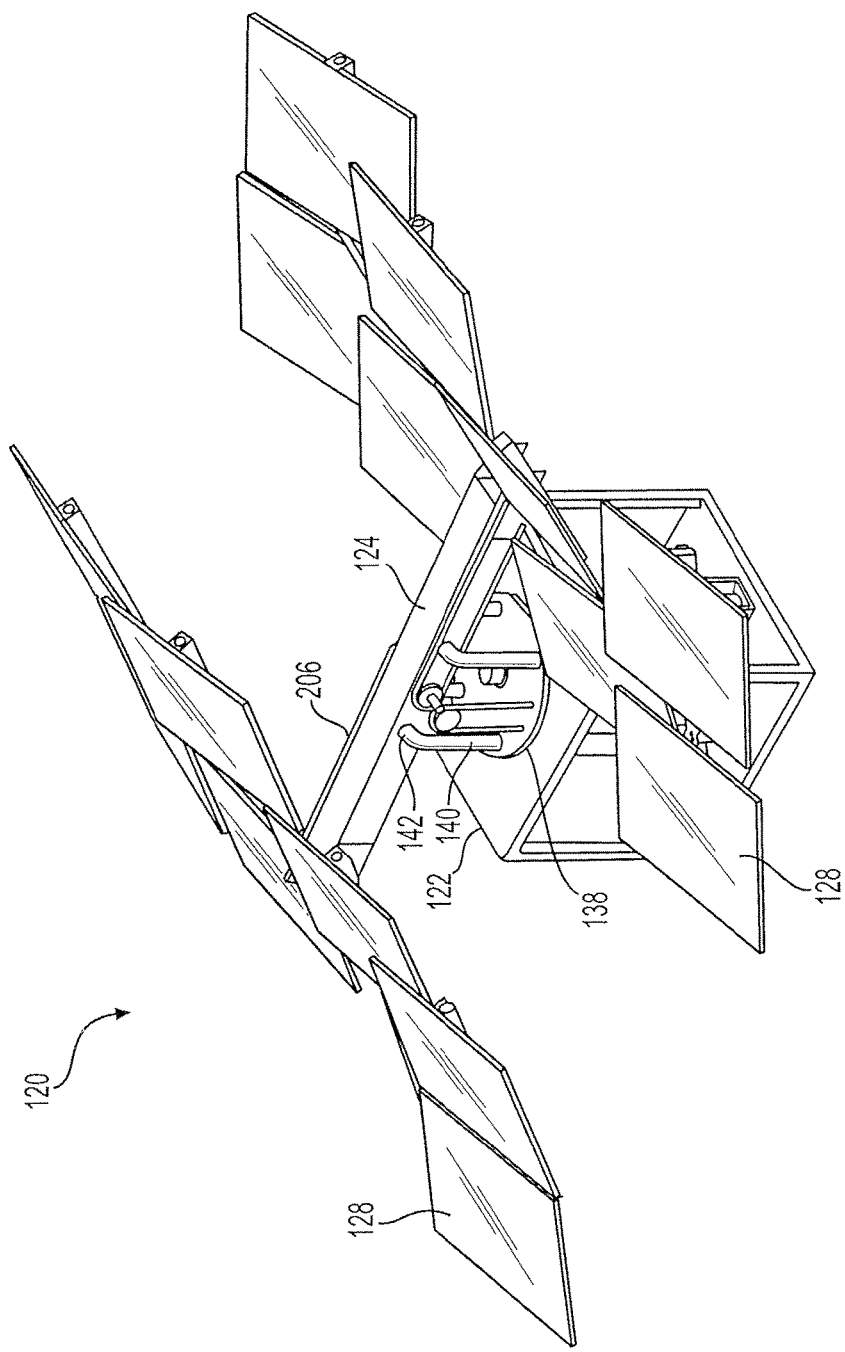
FIG. 6 is a partial perspective view of a second embodiment of a solar heating apparatus.

FIGS. 6-10 show a second embodiment of the solar heating apparatus, designated as 120 in the drawings. FIG. 6 shows a plurality of mirrors mounted on a single base box 122. It will be understood, however, that an array of solar reflectors may be constructed by assembling a plurality of base boxes 122 in rows and columns to focus sufficient reflected solar radiation on a solar collector or collectors. As shown in FIGS. 6 and 7, the main axle may take the form of a beam 124 rotatably mounted above the base box 122. Mirror support arms 126 may be rotatably mounted at least at opposite ends of the beam 124. A plurality of mirror mounts 127 are mounted on the mirror support arms 126, and the mirrors 128 are attached to the mirror mounts 127. In all embodiments of the solar heating apparatus, the mirror mounts 127 may be manually rotated and adjusted to optimize focusing reflected solar radiation on the solar collector (s), and then the mounts 127 are fixed to the support arms 126, e.g., by welding. Thereafter, only the main axles or beams 24, 124 and the mirror support arms 26, 126 are rotated to adjust for changes in the sun's azimuth and elevation.

It will be understood that the azimuth motor 30, elevation motor 32, and power transmission shafts 34, 36 shown in FIG. 1 are also used in the solar heating apparatus 120 to simultaneously adjust mirrors 128 supported by multiple base boxes 122 for azimuth and elevation. However, the stanchions 38 used in the solar heating apparatus 20 to distribute the load by supporting the mirror assemblies at the junction of the main axle 24 and the mirror support arms 26 are not present in the solar heating apparatus 120.

Instead, the beam box 122 has a circular plate 138 rotatably mounted on its top wall. A pair of parallel, inverted U-shaped legs 140 are attached to the top surface of the circular plate 138. The crossbars 142 of the inverted U-shaped legs 140 extend through the beam 124 to fix the beam 124 to the circular plate 138 for rotation therewith. As shown in FIGS. 8-10, a central column 144 is fixed to the floor of the base box 122. An upper shaft 146 is rotatably mounted on a post 145 extending upward from the column 144, extends through the top wall of the base box 122, and is fixed to the center of the circular plate 138 so that rotation of the upper shaft 146 rotates the circular plate 138 and the beam 124 mounted thereon to adjust for changes in the sun's azimuth. Thus, in this embodiment, adjustments for changes in the sun's azimuth are made by rotation of the mirrors 128 about a vertical axis extending axially through the central column 144.

The azimuth power transmission shaft 34 extends through an opening 152 in the azimuth gear box 156 at the bottom of the base box 122 and engages a gear train (e.g., a worm gear) that rotates a shaft 160 extending upward from the azimuth gear box 156 and has a drive sprocket 162 or pulley mounted at its upper end. An endless chain 164 or belt connects the drive sprocket 162 with a driven sprocket 166 or pulley mounted on the upper shaft 146 so that rotation of the shaft 160 by the azimuth gear box 156 results in rotation of the circular plate 138 and the beam 124 to track changes in the sun's azimuth, as shown in FIG. 9.

The elevation power transmission shaft 36 extends through an opening 154 in the elevation gear box 158 and engages a gear train (e.g., a worm gear) that rotates a shaft 168 extending upward from the elevation gear box 158 and has a drive sprocket 170 or pulley at its upper end. An endless chain 172 or belt extends between the drive sprocket 170 and the lower sprocket 174 or pulley wheel of a double sheave 176 rotatably mounted on the post 145 below the upper shaft 146. The upper sprocket 178 or pulley wheel of the double sheave 176 is connected by a chain 180 or belt to the drive sprocket 182 on the spindle of a bevel gear assembly 184 supported on an arm 186 that extends from the lower portion of the upper shaft 146. Rotation of the bevel gear drive sprocket 182 causes rotation of a bevel gear 188 (shown in FIG. 10) having a sprocket 190 or pulley wheel attached thereto that is connected by a chain 192 or belt that extends through an opening or openings in the circular plate 138 to engage the sprocket 194 or pulley wheel fixed to the end of a rotor 196 that is rotatably mounted on the beam 124.

The rotor 196 has spaced apart drive sprockets 198, 200 fixed thereto that are disposed on opposite sides of the beam 124. The rotor drive sprocket 198 is connected by an endless chain 202 or belt to a driven sprocket 204 fixed to the mirror support arm 126 at one end of the beam 124, and on the opposite side of the beam, the drive sprocket 200 is connected by a chain 206 or belt to a driven sprocket fixed to the mirror support arm 126 at the opposite end of the beam 124. The bevel gear support arm 186 ensures that the bevel gear assembly passively rotates with the circular plate 138 when the circular plate 138 is rotated to track changes in azimuth without rotating the bevel gears 188. Thus, rotation of the elevation power transmission shaft 36 results in rotation of the mirror support arms 126 at opposite ends of the beam 124 to change the tilt of the mirrors 128 to track changes in the sun's elevation via a series of gear trains and chain or belt drives, rotating the mirrors about horizontal axes defined by the mirror support arms 126.

Figure 11:
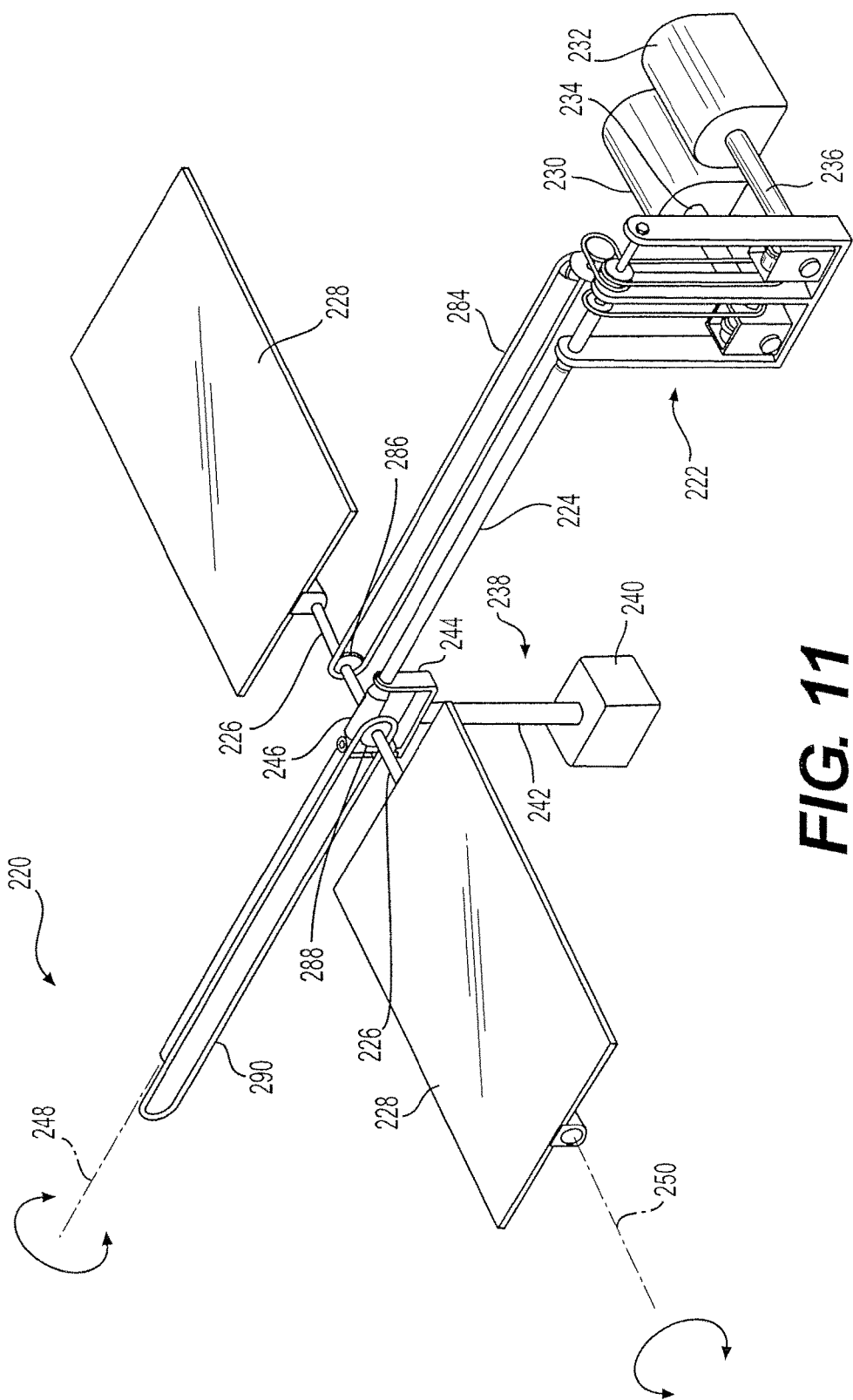
FIG. 11 is a diagrammatic partial perspective view of a third embodiment of a solar heating apparatus.

FIGS. 11 through 17 show a third embodiment of a solar heating apparatus, designated by 220 in the drawings. As shown in FIG. 11, in this embodiment, the apparatus 220 includes a base frame 222 for mounting the drive mechanism for a column of one or more rows of solar reflectors (mirrors). As in previous embodiments, the apparatus 220 includes a main axle 224 extending from the base frame 222 and at least a pair of mirror support arms 226 extending orthogonally from the main axle 224, the mirror support arms 226 having mirrors 228 mounted thereon. An azimuth tracking motor 230 and an elevation tracking motor 232 have corresponding power transmission shafts 234, 236 that extend through holes 252, 254 in the corresponding gear boxes 256, 258 mounted in the base frame 222. Only a single base frame 222 is shown in FIG. 11 for simplicity of illustration and clarity of explanation of the structure, but it will be understood that the apparatus 220 may include a plurality of base frames 222 extending linearly to support a plurality of columns of mirrors 228.

The main axle 224 is supported above the ground by a stanchion 238 having a footer 240, a post 242 extending upward from the footer 240, and a U-shaped bracket 244 mounted on the post 242. A two-axis rotational element (TARE) or coupler 246 is mounted in the bracket 244. The main axle 224 is segmented, each segment having opposite ends rotationally supported in axial ends of a coupler 246, while the mirror support arms 226 extend laterally from opposite sides of the coupler 246 and are rotationally supported thereby. The main axle 224 defines a first axis of rotation 248, and the mirror support arms 226 define a second axis of rotation 250. Only a single stanchion 238 is shown in FIG. 11 for simplicity of illustration and clarity of explanation of the structure, but it will be understood that the apparatus 220 may include a plurality of stanchions 238 extending linearly to support a plurality of rows of mirrors 228.

Figure 12:
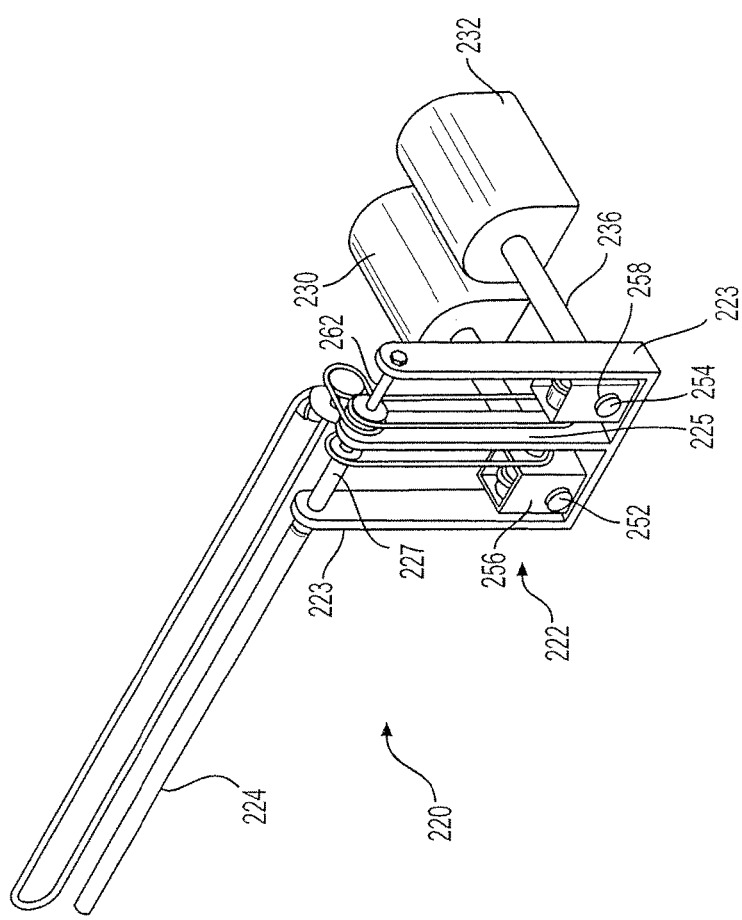
FIG. 12 is a perspective view of the base frame of the apparatus of FIG. 11.
Figure 15:
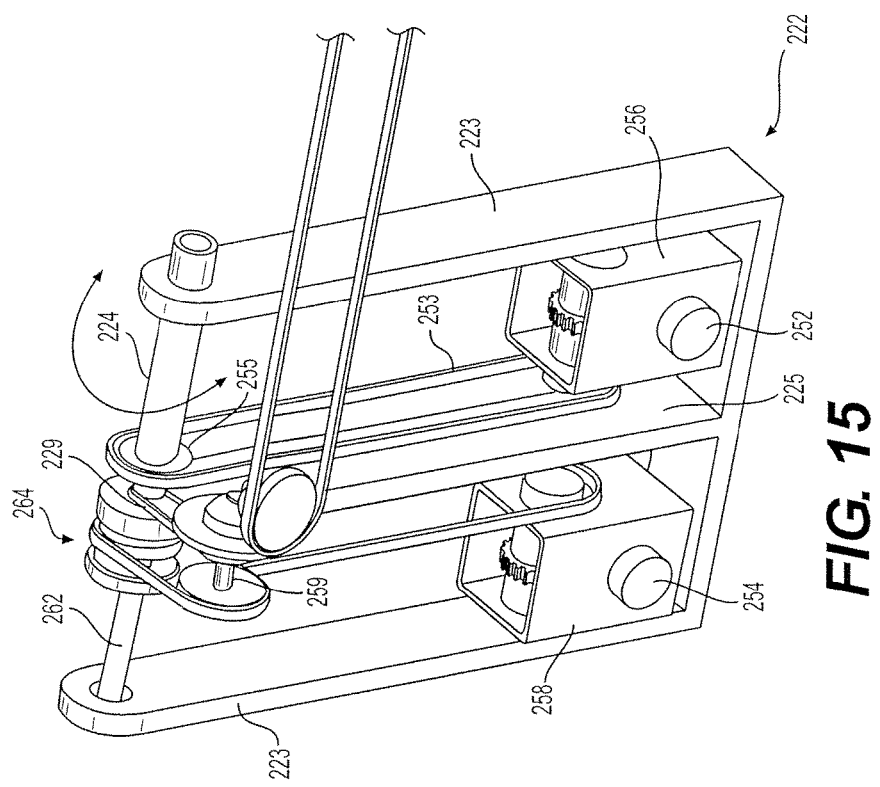
FIG. 15 is a partial perspective view of the apparatus of FIG. 11, showing the mechanism for rotation of the main axle.
Figure 17:
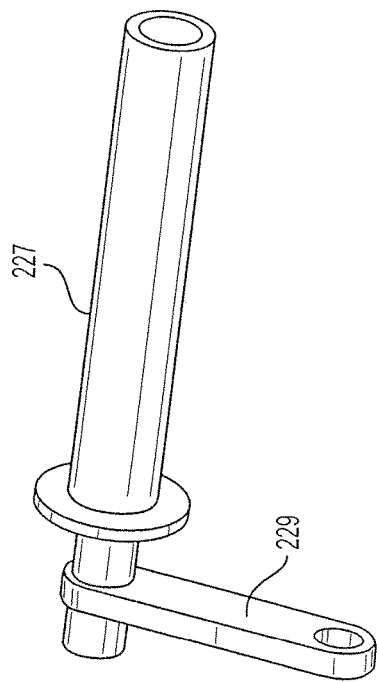
FIG. 17 is a perspective view of the main axle stub (or one end of a main axle) of the apparatus of FIG. 11, showing the bevel gear support arm.

The base frame 222 is shown in more detail in FIG. 12. The base frame 222 may be housed in a box, similar to the boxes 22 and 122 of the previous embodiments, but has been omitted in the drawings for clarity of illustration. The base frame 222 is generally U-shaped, having opposing end walls 223 and a partition 225 or divider wall separating the azimuth compartment from the elevation compartment. One end of the main axle 224 (or a main axle stub 227, into which the main axle 224 telescopes and is fixed for rotation therewith) is rotationally supported between an end wall 223 and the partition wall 225 in the azimuth compartment above the azimuth gear box 256. As shown in FIG. 15, a chain drive 253 extends between the azimuth gear box 256 and a sprocket 255 fixed on the main axle 224 (or main axle stub 227) for selective rotation of the main axle 224 to bank the mirrors 228 mounted on the mirror support arms 226 for tracking changes in the sun's azimuth when the azimuth power transmission shaft 234 is rotated. As shown in FIGS. 13-15 and 17, a bevel gear support arm 229 extends from the main axle 224 (or main axle stub 227) and supports the spindle 259 of a bevel gear assembly 260 so that the bevel gear assembly 260 passively rotates with the main axle 224 when the azimuth is tracked without rotating the bevel gears themselves.

Figure 16:
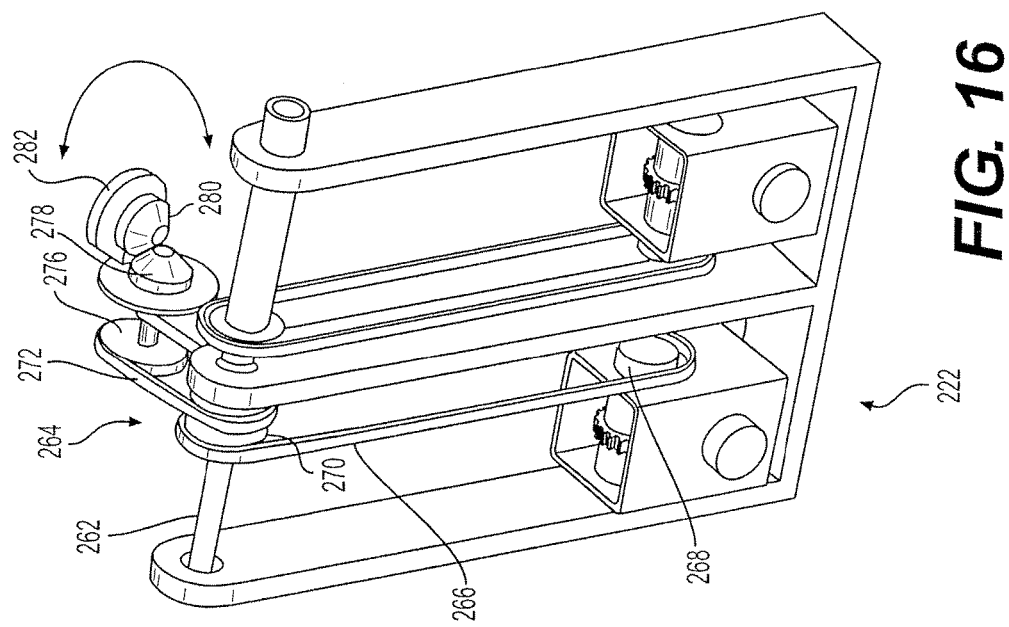
FIG. 16 is a partial perspective view of the apparatus of FIG. 11, showing the mechanism for rotation of the mirror support arms.

As shown in FIGS. 12-14 and 16, a support rod 262 extends between an end wall 223 of the U-shaped base frame 222 and the partition wall 225 in the elevation compartment above the elevation gear box 258. A double sprocket wheel 264 or double sheave pulley is rotatably mounted on the support rod 262. An endless chain 266 or belt extends between a sprocket 268 on the elevation gear box 258 and a drive sprocket 270 or wheel of the double sheave 264. Another chain 272 extends between the driven sprocket 274 of the double sprocket (sheave) 264 and a drive sprocket 276 at one end of the spindle 259. Rotation of the spindle 259 by the chain drive 272 rotates a drive bevel gear 278 and corresponding driven bevel gear 280, as shown in FIG. 16.

Figures 13, 14:
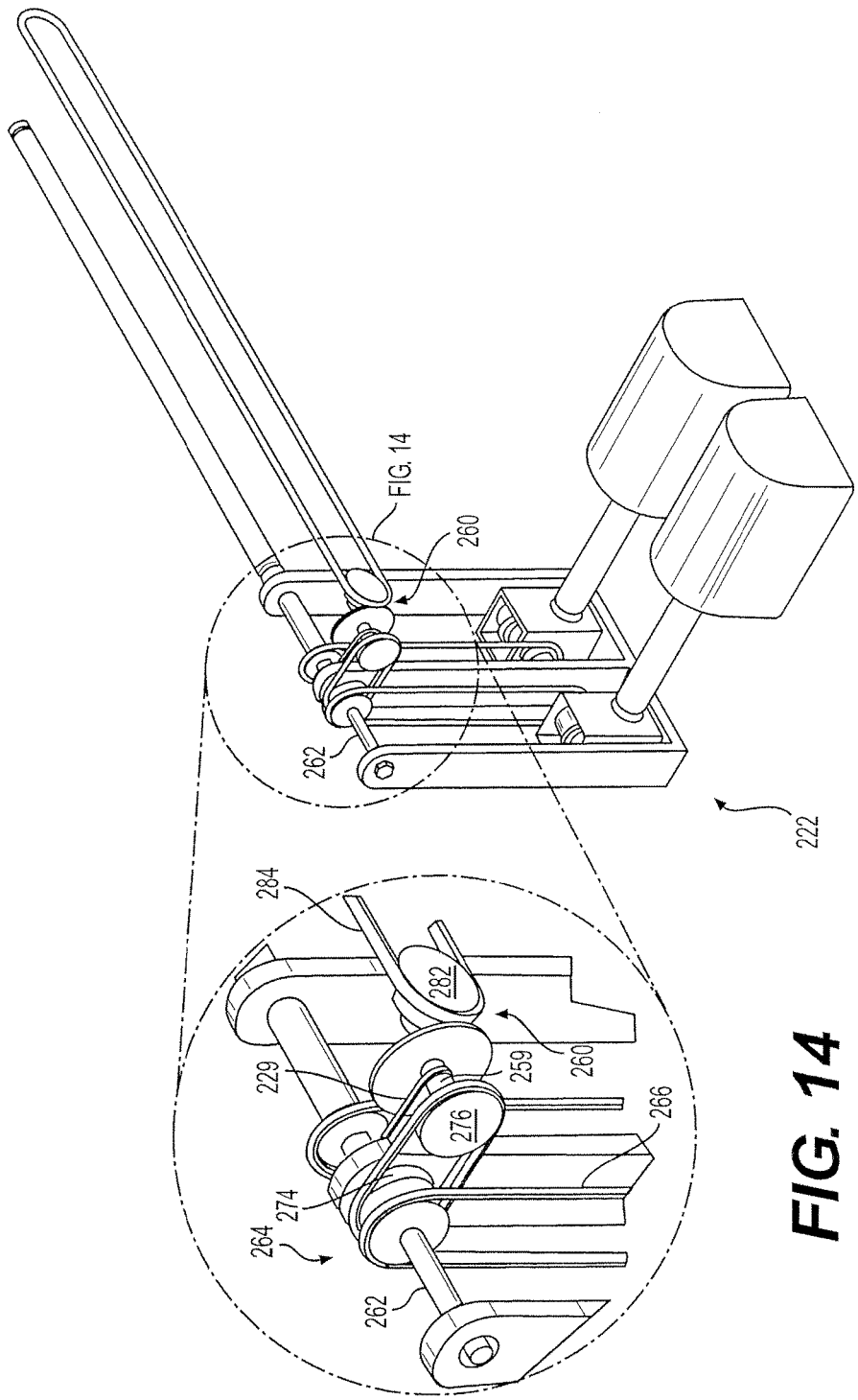
FIG. 13 is a perspective view showing the drive mechanisms of the apparatus of FIG. 11.
FIG. 14 is a detailed perspective view of area 14 of FIG. 13, showing details of the bevel gear mechanism.

A drive sprocket 282 or wheel is fixed to the driven bevel gear 280. As shown in FIGS. 11 and 14, an endless chain 284 or drive belt is connected between the drive sprocket 282 and a driven sprocket 286 or wheel mounted on one of the mirror support arms 226. Rotation of the mirror support arm 226 on one side of the coupler 246 results in rotation of the mirror support arm 226 extending from the opposite side of the coupler 246. A corresponding sprocket 288 is mounted on the mirror support arm 226 on the opposite side of the coupler 246. Another endless chain 290 may be mounted on the sprocket 288. It will be understood that another stanchion 238 supporting another row of mirrors 228 may be positioned so that the free end of the chain 290 may be supported on the sprocket of a corresponding mirror support arm 226. Thus, selective rotation of the elevation power transmission shaft 236 by the elevation tracking motor 232 results in rotation of the mirror support arms 226 to tilt the mirrors 228 to track the changing elevation of the sun via a series of gear trains and chain or belt drives.

The embodiments of a solar heating apparatus described herein offer an alternative to parabolic troughs and other solar tracking hardware that usually utilize a single expensive ground support to support the weight and wear and tear from exposure of an array of solar reflectors to the environment, and which are difficult to keep the reflectors clean. Although the present apparatus require more ground supports, those supports may be more economically supplied, since the arrays of mirrors can be more lightweight and subject to less environmental stress, and are spaced to provide easier access for maintenance and cleaning the mirrors. In addition, although described for mounting reflectors to focus on thermal solar collectors, the apparatus is capable of mounting photovoltaic panels on the support arms for tracking solar radiation for the generation of electrical energy directly from the solar radiation. It will be understood that in the various embodiments of the solar heating apparatus described herein, the bevel gears are means to transfer rotational motion in a perpendicular direction. Other means to do so may include a worm gear assembly.

It is to be understood that the solar heating apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar heating apparatus, comprising at least one column of solar reflectors having:
  a U-shaped base frame having opposing end uprights and a partition wall between the end uprights dividing the base frame into an azimuth drive compartment and an elevation drive compartment;
  at least one stanchion;
  a two rotational axis coupler mounted on the stanchion, the coupler being elongated and supporting rotation both axially and laterally, orthogonal to the axial rotation;
  an elongated main axle supported above and parallel to the ground by the base frame and the stanchion, the main axle having a first end rotationally supported in the azimuth drive compartment by both one of the end uprights and the partition wall, the main axle extending axially into the coupler and being supported for axial rotation thereby, wherein the main axle further comprises a bevel gear support arm extending from the main axle in the azimuth drive compartment;
  at least one mirror support arm extending laterally from the coupler and supported for lateral rotation orthogonal to the main axle, the mirror support arm having a plurality of mirrors mounted thereon;
  an azimuthal drive mechanism mounted in the azimuth drive compartment and coupled to the main axle, the azimuthal drive mechanism selectively rotating the main axle to bank the mirrors for tracking changes in the sun's azimuth, wherein the azimuthal drive mechanism comprises an azimuth gear box and an endless loop drive mechanism connecting the azimuth gear box and the main axle to drive rotation of the main axle; and
  an elevation drive mechanism at least partially mounted in the elevation drive compartment and coupled to the at least one mirror support arm, the elevation drive mechanism selectively rotating the at least one mirror support arm to tilt the mirrors for tracking changes in the sun's elevation, wherein the elevation drive mechanism includes:

an elevation gear box disposed in the elevation drive compartment;

a double drive wheel rotationally disposed above the elevation gear box in the elevation drive compartment; and a bevel gear assembly for rotating the at least one mirror support arm and tilting the mirrors to track changes in the sun's elevation.

2. The solar heating apparatus according to claim 1, wherein the bevel gear assembly includes:

a spindle having an upper end and a lower end, the spindle being journaled through the bevel gear support arm for rotation therein;

a drive wheel mounted on the lower end of the spindle;

a drive bevel gear mounted on the upper end of the spindle; and a driven bevel gear meshing with the drive bevel gear;

a driven wheel mounted on said at least one mirror support arm; and a plurality of endless loop drives, including:

a first loop extending between the elevation gear box and the double drive wheel;

a second loop extending between the double drive wheel and the drive wheel of the bevel gear assembly; and a third loop extending between the driven bevel gear and the driven wheel mounted on said at least one first mirror support arm;

whereby rotation of the first endless loop by the elevation gear box rotates said at least one mirror support arm, tilting said mirrors to track changes in the sun's elevation.

3. The solar heating apparatus according to claim 2, wherein each said endless loop drive comprises a chain drive, each said drive wheel comprising a sprocket wheel.

4. The solar heating apparatus according to claim 2, further comprising: an azimuth tracking motor; an azimuth power transmission shaft extending from the azimuth tracking motor through the azimuth gear box, the azimuth tracking motor selectively activating the azimuth gear box to rotate said main axle and bank said mirrors; an elevation tracking motor; and an elevation power transmission shaft extending through said elevation gear box, the elevation tracking motor selectively activating said elevation gear box to rotate said at least one mirror support arm to tilt said mirrors.

5. The solar heating apparatus according to claim 4, wherein said at least one column comprises a plurality of columns, said azimuth power transmission shaft and said elevation power shaft extending through the azimuth gear box and the elevation gear box, respectively, of each said base frame to simultaneously bank and tilt the mirrors in each said column to track changes in the sun's azimuth and elevation.

6. The solar heating apparatus according to claim 4, wherein said at least one stanchion comprises a plurality of stanchions, each of the stanchions having a corresponding said two rotational axis coupler, a corresponding said elongated main axle, and a corresponding said at least one mirror support arm mounted thereon on order to define a plurality of rows of mirrors, the apparatus further comprising a series of endless loop drive mechanisms connecting said mirror support arms for tilting the rows of mirrors simultaneously.

* * * * *